United States Patent
Davis et al.

(10) Patent No.: US 11,186,507 B1
(45) Date of Patent: Nov. 30, 2021

(54) ALGAL HARVESTING AND WATER FILTRATION

(71) Applicant: National Technology & Engineering Solutions of Sandia, LLC, Albuquerque, NM (US)

(72) Inventors: Ryan Wesley Davis, San Jose, CA (US); Eric Monroe, Pleasanton, CA (US); Sungwhan Kim, San Ramon, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/904,202

(22) Filed: Jun. 17, 2020

(51) Int. Cl.
| | |
|---|---|
| *C02F 3/32* | (2006.01) |
| *C02F 1/00* | (2006.01) |
| *A01G 33/00* | (2006.01) |
| *C02F 101/20* | (2006.01) |
| *C02F 101/16* | (2006.01) |
| *C02F 101/10* | (2006.01) |

(52) U.S. Cl.
CPC .............. *C02F 3/327* (2013.01); *A01G 33/00* (2013.01); *C02F 1/004* (2013.01); *C02F 1/006* (2013.01); *C02F 2101/103* (2013.01); *C02F 2101/105* (2013.01); *C02F 2101/106* (2013.01); *C02F 2101/16* (2013.01); *C02F 2101/20* (2013.01)

(58) Field of Classification Search
CPC .......... C02F 3/327; C02F 1/004; C02F 1/006; C02F 2101/16; C02F 2101/106; C02F 2101/105; C02F 2101/103; C02F 2101/20; A01G 33/00
USPC ........ 210/106, 602, 615, 903, 906, 911, 912
See application file for complete search history.

(56) References Cited

U.S. PATENT DOCUMENTS

| | | | | |
|---|---|---|---|---|
| 3,728,254 A | * | 4/1973 | Carothers ................ | C05F 3/04 210/602 |
| 4,695,384 A | * | 9/1987 | Ripl ......................... | E03B 3/00 210/602 |
| 4,995,980 A | * | 2/1991 | Jaubert ..................... | C02F 3/10 210/602 |

(Continued)

FOREIGN PATENT DOCUMENTS

| | | | |
|---|---|---|---|
| DE | 19731309 A1 | * | 1/1999 |
| WO | 2014197919 A1 | | 12/2014 |

*Primary Examiner* — Fred Prince
(74) *Attorney, Agent, or Firm* — Medley, Behrens & Lewis, LLC

(57) ABSTRACT

Systems for algae-based water filtration and algae harvesting are described herein. A flow-way comprises a channel and a divider positioned within the channel that separates the channel into sub-channels. The flow-way further includes an algal growth that grows on a sidewall of the channel and/or the divider. The algal growth can be established in the flow-way by positioning a pre-seeded mesh element within the channel, the pre-seeded mesh element having an algae culture growing thereon prior to positioning the pre-seeded mesh within the channel. A harvesting system comprises a hinged container that includes a straining screen. The hinged container is positioned downstream from a flow-way and receives water from the flow-way. Biomass in the water is strained by and accumulates on the screen. Weight of the accumulated biomass causes the hinged container to tip and deposit the accumulated biomass in a second container.

20 Claims, 8 Drawing Sheets

(56) References Cited

U.S. PATENT DOCUMENTS

| | | | | |
|---|---|---|---|---|
| 5,591,341 A * | 1/1997 | Jensen | ................... | B01D 21/04 |
| | | | | 210/170.07 |
| 5,670,046 A * | 9/1997 | Kimmel | ................ | C02F 3/2806 |
| | | | | 210/602 |
| 6,033,559 A * | 3/2000 | Bender | ..................... | C02F 3/10 |
| | | | | 210/150 |
| 8,507,253 B2 * | 8/2013 | Berzin | ................... | B01D 53/85 |
| | | | | 435/257.1 |
| 9,003,695 B2 | 4/2015 | Oyler | | |
| 9,347,030 B2 * | 5/2016 | Fiorentino | ............. | C12M 23/06 |
| 9,376,656 B2 | 6/2016 | Bartilson | | |
| 2010/0323436 A1 * | 12/2010 | Lee | ....................... | C12M 27/20 |
| | | | | 435/292.1 |
| 2017/0027120 A1 | 2/2017 | Parsheh et al. | | |
| 2017/0318771 A1 | 11/2017 | Hazlebeck et al. | | |

* cited by examiner

ALGAL HARVESTING AND WATER FILTRATION

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

The sanitation and ecological health of waterways is dependent in part on the presence of chemical and biological contaminants in the waterways. These contaminants can directly affect the suitability of waters for human use or as a habitat for other flora and fauna. These contaminants can also indirectly affect the condition of waterways by encouraging the development of adverse conditions in a waterway. By way of example, fertilizer runoff from agricultural operations can cause substantial increases in the nitrogen and phosphorous content of a downstream waterway. These increases in nitrogen and phosphorous can in turn promote the growth of harmful algae blooms in the waterway. These harmful algae blooms can themselves cause eutrophication and anoxic conditions (dead zones) in the waterway or secretion of toxins into the waterway, potentially killing other organisms and rendering the waterway unsafe for human use.

SUMMARY

The following is a brief summary of subject matter that is described in greater detail herein. This summary is not intended to be limiting as to the scope of the claims.

Technologies relating to filtering algae-promoting contaminants from water flows are described herein. Further, technologies relating to growing and harvesting algae are described herein. Whereas uncontrolled algae blooms in waterways can be ecologically harmful, various forms of algae may serve useful purposes. For example, algae can be used as biomass for fuel, as a precursor in certain chemical processes (e.g., blendstocks for certain thermopolymers), as aquaculture feeds, etc. Algae growth can be encouraged in a controlled system in order to facilitate harvesting of the algae for useful purposes. Furthermore, controlled growth of algae can be employed as a means by which various contaminants can be removed from a flow of water.

In an exemplary embodiment, a system comprises a flow-way that is configured to accommodate a flow of water and that is further configured to support algal growth therein. The flow-way comprises a channel that is configured to receive a flow of water from a water source. The water source can be, for example, a reservoir, a water pipe, a pump, a natural or diverted stream or river, an irrigation channel, or substantially any other source of water from which a flow of the water can be established in the channel. The channel has a length and a breadth, wherein water flows along the length of the channel. The flow-way further comprises a divider that is positioned within the channel and that extends along the length of the channel. The divider separates the channel into a first portion and a second portion, wherein water flowing through the first portion is at least partially separated from water flowing through the second portion.

The flow-way further comprises an algal growth formed on a sidewall of the channel or the divider. As water flows through the flow-way, the algal growth takes nutrients (e.g., nitrogen, phosphorous, or other nutrients) from the water in order to grow. Therefore, the algal growth in the flow-way reduces the nutrient content of the water prior to the water exiting the flow-way, mitigating the risk of the water causing undesired algal growth in downstream waterways. The algal growth can also uptake various other contaminants from the water. By way of example, and not limitation, the algal growth can absorb metals such as, but not limited to, arsenic, selenium, lead, and mercury. Accordingly, the algal growth can facilitate removal of contaminants from water flowing in the flow-way.

The flow-way provides a greater surface area for growth of algae than a pipe or other channel. Furthermore, the flow-way allows suspended solids to settle at the bottom of the channel without fouling the algae growing on sidewalls of the channel or the dividers. Therefore, sediments such as ash do not readily become fouled in the algae, and the quality of algal biomass that can be harvested from the sidewalls of the flow-way is improved relative to other means of algae growth in waterways.

In some embodiments, the flow-way can be seeded with algae to facilitate growth of algae within the flow-way. In an exemplary embodiment, an algae culture can be grown on a supporting structure such as a screen, netting, or mesh. The supporting structure including the algae culture can then be laid in the flow-way, or affixed to a sidewall of the flow-way. The supporting structure facilitates growth of the algae culture within the flow-way. Further, the algae culture can be selected to have a desired behavior. By way of example, the algae culture can be selected to be well-suited to removal of a particular contaminant in water. Installation of the supporting structure in a flow-way can therefore facilitate selective removal of contaminants from water in the flow-way.

In further embodiments, a system comprises a hinged container that includes an inlet that is configured to receive water from a channel, pipe, or other waterway in which algae grows. By way of example, the hinged container can be configured to receive a flow of water from the flow-way system described above. The hinged container comprises an outlet from which water entering the hinged container ultimately flows. The outlet of the hinged container can be in fluid communication with a pipe or other channel for conveyance of the water to another location. The hinged container further comprises a straining screen through which water entering the hinged container flows. The straining screen is configured to strain biomass, such as algae, from the flow of water entering the hinged container. As biomass accumulates on the straining screen, water also tends to accumulate within a portion of the hinged container in front of the straining screen (e.g., relative to the flow of water). The hinged container is configured such that, when the biomass and the water accumulate within the portion of the hinged container in front of the straining screen, the hinged container tips. The tipping of the hinged container causes the biomass accumulated on the straining screen to fall into a receptacle for later collection. After the biomass and accumulated water are tipped from the hinged container, the hinged container returns to its original position (prior to tipping), whereupon water continues to flow into the inlet of the hinged container and out of the outlet of the hinged container. The hinged container is suitable for straining non-attached algae from a flow of water without becoming fouled over time, and while retaining strained algae for use as biomass in various applications. The hinged container does not need a source of external power to operate, and is therefore suitable for use in remote, austere environments.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
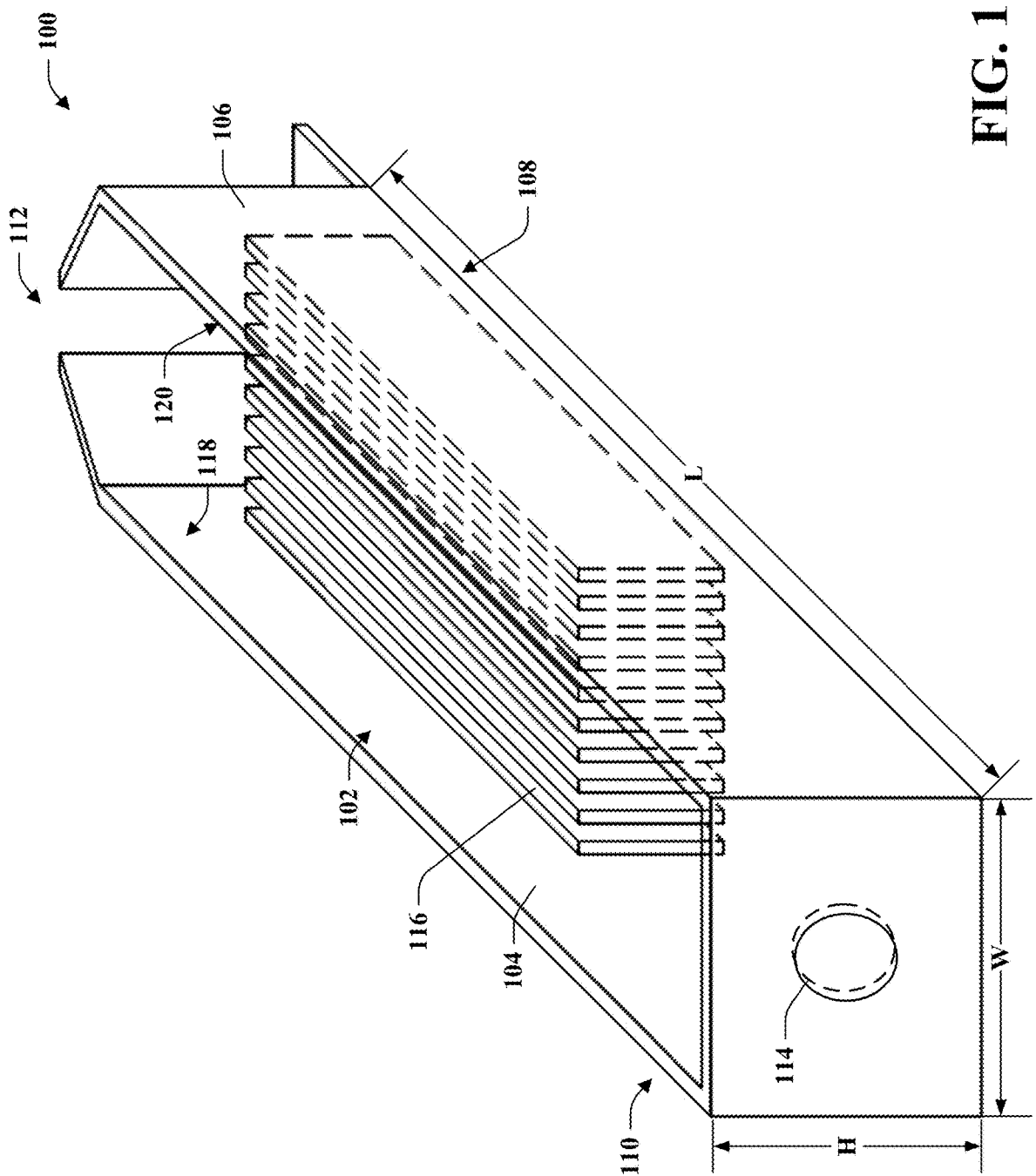
FIG. 1 is a diagram of an exemplary flow-way for algae growth.

Various technologies pertaining to algal cultivation and harvesting and water decontamination are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices may be shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

With reference to FIG. 1, an exemplary flow-way 100 that facilitates algae growth and decontamination of water is illustrated. The flow-way 100 includes a channel 102 through which water flows. The channel 102 has a length L and a width W. The channel 102 is defined by sidewalls 104, 106 and a bottom surface 108. In the exemplary flow-way 100, the channel 102 is open-topped. However, it is to be understood that in various embodiments the channel 102 can further be defined by a top portion that extends along all or part of the length and/or width of the channel 102. The flow-way 100 can be configured to receive water at a first inlet end 110 of the flow-way 100 and to outlet water at a second outlet end 112 of the flow-way 100. If the flow-way 100 is open-topped, the flow-way 100 can receive water directly into the top of the flow-way 100 at the inlet end 110. The flow-way 100 can also optionally receive water by way of an inlet port 114 positioned at the inlet end 110 (for example, in embodiments wherein the channel 102 is covered by a top portion). By way of example, the inlet port 114 of the channel 102 can be in fluid communication with a pipe (not illustrated) that carries a flow of water.

The flow-way 100 further includes a plurality of dividers 116. The dividers 116 are positioned within the channel 102 and extend along the length of the channel 102. The dividers 116 can extend upward to have a same height H as the sidewalls 104, 106, or the dividers 116 can have a shorter height than the sidewalls 104, 106. Each additional divider in the dividers 116 separates the channel 102 into respective first and second portions. By way of example, a single divider separates the channel 102 into 2 portions, two dividers separate the channel 102 into 3 portions, and 3 dividers separate the channel 102 into 4 portions. In general, a number of the portions of the channel defined by the dividers 116 is n+1 where n is the number of the dividers 116.

The flow-way 100 is configured to facilitate algal growth on the dividers 116 and along interior surfaces 118, 120 of the sidewalls 104, 106. As water flows through the channel 102 (e.g., from an open top of the channel 102 at the first end 110 to the outlet 112, or from the inlet 114 to the outlet 112), algae in the flow-way 100 bioaccumulates nutrients in the water, such as nitrogen and phosphorous. An algal growth in the flow-way 100 can therefore reduce a concentration of algae nutrients in the water flowing out of the outlet 112 of the flow-way 100, relative to the concentration of such nutrients at the inlet 110 of the flow-way 100. In various embodiments, an algal growth in the flow-way 100 can take up contaminants other than those conventionally understood as algal macronutrients. In a non-limiting example, an algal growth in the flow-way 100 can take up heavy metals such as arsenic, mercury, lead, or selenium from water in the flow-way 100. The dividers 116 increase a surface area on which algae can grow and be exposed to the flow of water in the flow-way 100, thereby improving the ability of the algae to remove contaminants and algal nutrients from the water. The algae can further bioaccumulate or trap organic and inorganic carbon, thereby limiting the potential for heterotrophic bacterial growth in the water. This can result in a reduction in fecal coliform in the water, or a reduction in overall biochemical oxygen demand (BOD) in the water.

Algae may be present in the flow-way 100 by virtue of a flow of water through the flow-way 100, which flow of water may already contain algal growths. For example, a flow of runoff water from a retaining pond may already include algae. In such cases, algae in the water may adhere to the dividers 116 or the interior surfaces 118, 120 of the sidewalls 104, 106, and then continue to grow. In some embodiments, it may be desirable to pre-seed the flow-way 100 with an algae culture. By way of example, it may be desired to employ the flow-way 100 to reduce the concentration of algae nutrients in a flow of water. In another non-limiting example, it may be desired to employ the flow-way 100 to reduce the concentration of another contaminant in the water, such as a heavy metal. In such embodiments, the flow-way 100 can be pre-seeded with an algae culture having a desired behavior with respect to a nutrient or contaminant in water.

Figure 2:
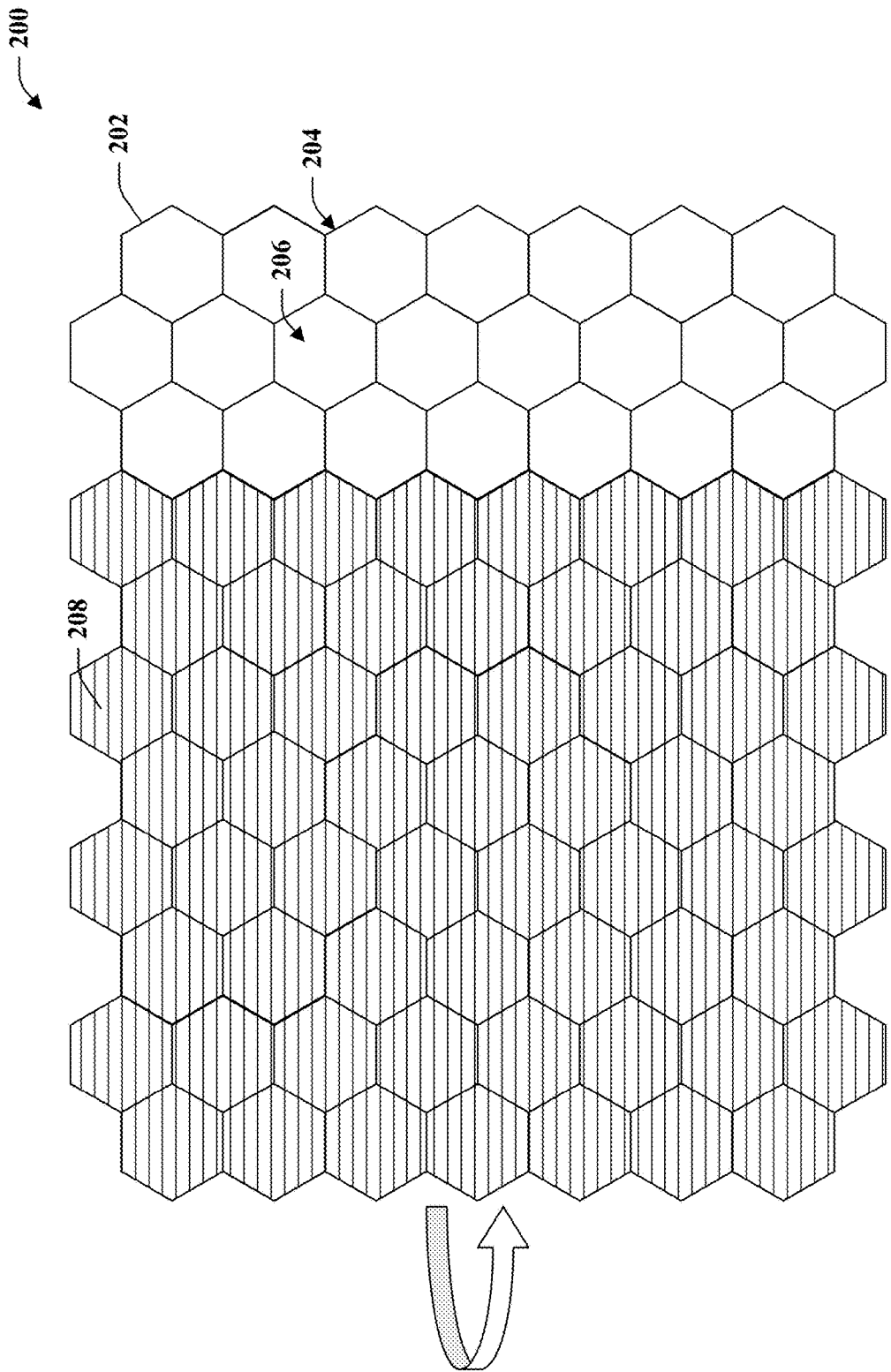
FIG. 2 depicts an exemplary mesh element for growing algal cultures.

By way of example, and referring now to FIG. 2, an exemplary algae culture substrate 200 is shown. The substrate 200 comprises a mesh element 202. The mesh element 202 comprises filamentous strands 204 arranged in a substantially uniform pattern, such that the mesh element 202 includes interstitial spaces 206 that are defined by the pattern of the strands 204. In a non-limiting example, the strands 204 can be arranged to form edges of polygons, wherein the interstitial spaces 206 are the interiors of polygons formed by the strands 204. In the exemplary substrate 200, the strands 204 of the mesh element 202 are arranged to form hexagons, however the strands 204 can be arranged to form substantially any pattern. In further non-limiting examples, the strands 204 can be arranged to form interstitial spaces 206 having non-polygonal shapes (e.g., with curved edges).

An algae culture can be grown on the substrate 200 such that algae 208 grows from the strands 204 across the interstitial spaces 206 of the mesh element 202. The algae 208 can be introduced to the mesh element 202 by application of water or other fluid containing algal organisms to one or more of the strands 204. In other embodiments, the algae 208 can be introduced to and grown on the mesh element 202 by submerging the mesh element in a fluid suspension of algal organisms until the algae 208 grows along a portion of the mesh element 202. In various embodiments, the algae 208 can be grown along all of the mesh element 202 or only a desired portion of the mesh element 202. For example, it may be desirable to keep a portion of the mesh element 202 free of the algae 208 to facilitate handling of the mesh element 202.

As indicated in FIG. 2, the mesh element 202 can be rolled up into a roll for easier handling, storage, and/or transport. The mesh element 202 can subsequently be unrolled at another location where algae is desirably introduced. By way of example, and not limitation, and referring once again to FIG. 1, the mesh element 202 can be unrolled within the flow-way 100 to encourage growth of the algae 208 within the flow-way 100. For instance, the mesh element 202 having the algae 208 growing thereon can be unrolled along the length L of the channel 102 between two of the dividers 116. As water flows through the channel 102, the algae 208 can grow from the mesh element 202 to the dividers 116, whereupon the algae 208 continues to grow along and up the dividers 116.

In various applications, an ability of an algal growth within the flow-way 100 to remove a contaminant or nutrient from water in the flow-way 100 can depend on a maturity or extent of the algal growth. For example, an uptake rate of nitrogen and phosphorous from water in the flow-way 100 by the algal growth can depend on whether the algal growth has the capacity to continue growing within the flow-way 100 (e.g., due to physical space limitations within the flow-way 100). In another example, an ability of the algae to uptake a contaminant such as a heavy metal from water in the flow-way 100 can depend on an amount of the contaminant previously absorbed by the algal growth. In such examples, a portion of the algal growth can be harvested from the flow-way 100 to allow for new algal growth to occur. In some embodiments, the new algal growth can provide more effective or efficient removal of an algal nutrient or other contaminant from a flow of water in the flow-way 100.

Figure 3:
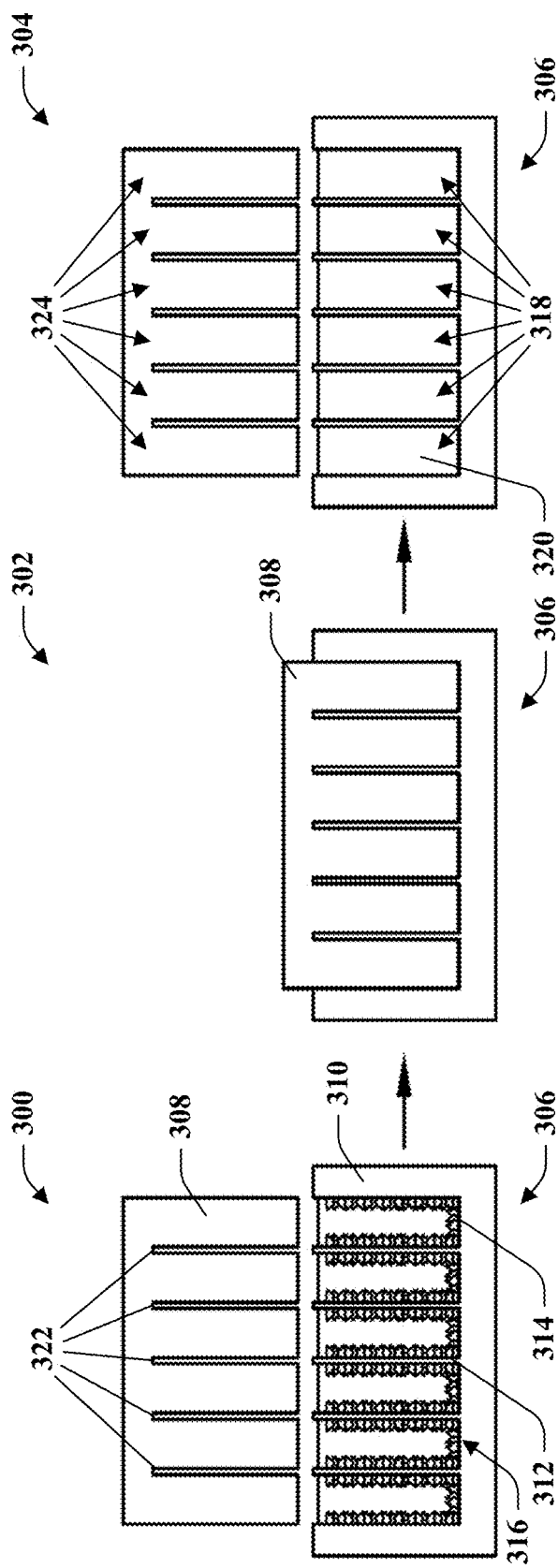
FIG. 3 shows cross-sectional views of an exemplary flow-way system for harvesting algae.

Referring now to FIG. 3, cross-sectional views 300-304 of an exemplary flow-way 306 and a harvesting device 308 for removing algae from the flow-way 306 are shown. The flow-way 306 comprises a channel 310 having one or more dividers 312 positioned therein. A length of the flow-way 306 shown in FIG. 3 extends into the page. The flow-way 306 includes an algal growth 314 that grows along each of the dividers 312 and along a bottom surface 316 of the channel 310. The dividers 312 form a plurality of sub-channels 318 in the channel 310 such that water 320 flowing in each of the sub-channels 318 is separated from water 320 flowing in the other sub-channels 318, although the present disclosure is not so-limited. It is to be understood, for instance, that whether the water 320 in the sub-channels 318 is completely separated from the water 320 in other sub-channels depends on a height of the dividers 312.

The harvesting device 308 is an element that has a surface profile that matches a surface profile of the flow-way 306. By way of example, the harvesting device 308 can include one or more slots 322 that are each configured to accept therein a portion of a respective divider in the one or more dividers 312. Stated differently, the harvesting device 308 includes m slots 322 corresponding to m dividers 312 of the flow-way 306, where m is an integer greater than zero, the slots 322 sized such that all or a portion of a divider in the dividers 312 fits into a slot in the slots 322. The slots 322 define a plurality of protrusions 324 of the harvesting device 308, wherein each of the protrusions 324 is configured to mate to a respective sub-channel in the sub-channels 318. The harvesting device 308 can be substantially solid, or can have an at least partially hollow interior. The harvesting device 308 can be composed of any suitable material such as, but not limited to, a plastic, a metal, or combination thereof.

In order to harvest a portion of the algal growth 314 from the flow-way 306, the harvesting device 308 can be lowered into the flow-way 306 such that the harvesting device 308 mates with the flow-way 306 as shown in the second cross-sectional view 302. The harvesting device 308 can then be moved along a length of the flow-way 306 (i.e., into or out of the page) while the harvesting device 308 is mated with the flow-way 306. The protrusions 324 of the harvesting device 308 cause at least a portion of the algal growth 314 to detach from the dividers 312 and/or surfaces of the channel 310 as the harvesting device 308 is moved along the flow-way 306. As the harvesting device 308 is moved along the flow-way 306, the harvesting device 308 pushes the detached portion of the algal growth 314 out of an outlet (not pictured) of the flow-way 306. The harvesting device 308 can then be lifted out of the flow-way 306 as shown in the third view 304, whereupon the water 320 can continue to flow in the flow-way 306 and additional algal growth can form therein.

Figure 4:
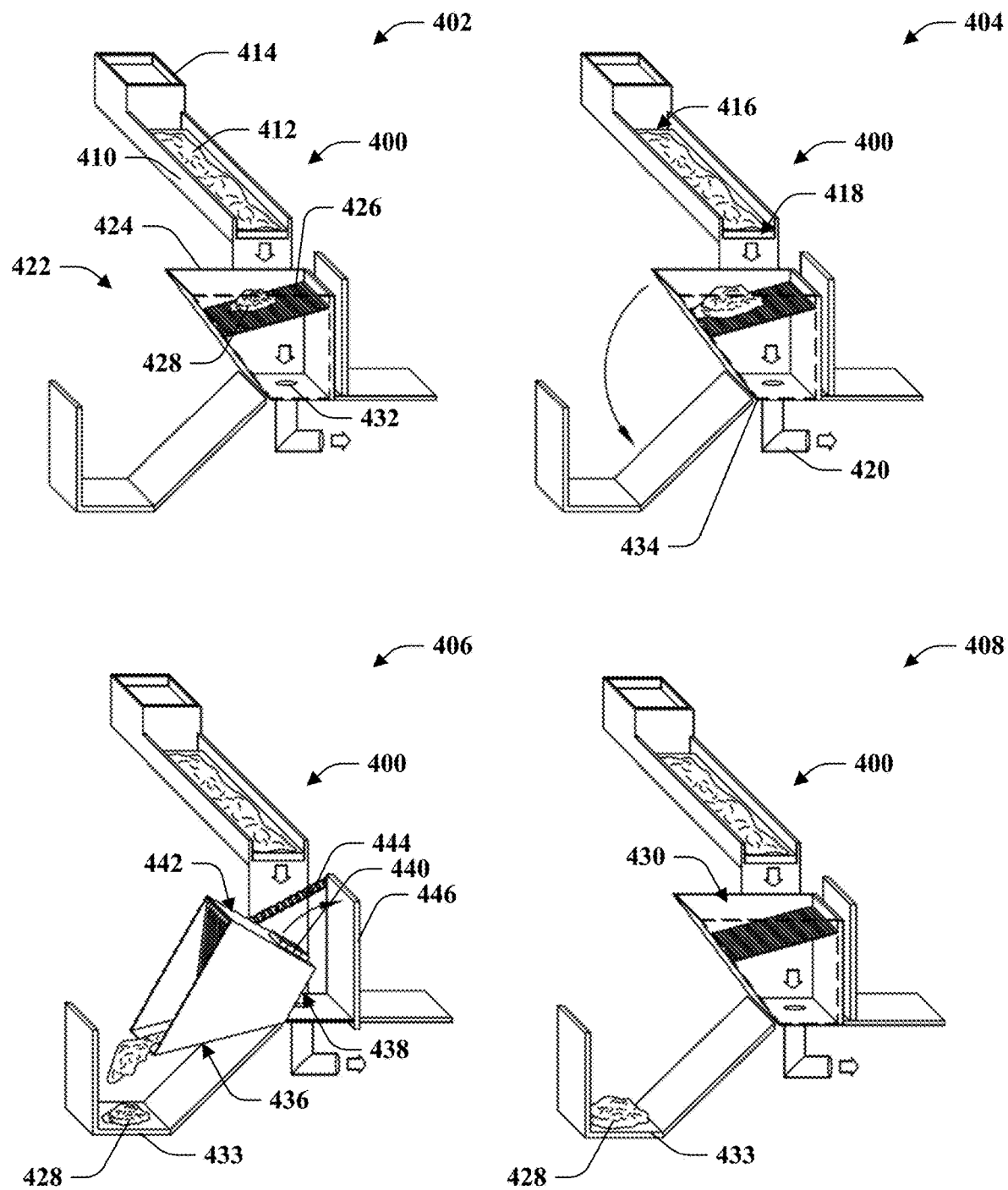
FIG. 4 is a perspective diagram showing views of another exemplary flow-way system for harvesting algae and other biomass from a flow of water.

In some embodiments, it may be desired that algal growth or other biomass in a channel be collected without manual or supervised operation of a harvesting device. Accordingly, with reference now to FIG. 4, a plurality of views 402-408 of an exemplary system 400 for automatic harvesting of algae and other biomass from a flow of water are shown. The system 400 comprises a flow-way 410 in which water 412 flows. In the exemplary system 400, the flow-way 410 receives the water 412 from a reservoir 414 positioned at an inlet end 416 of the flow-way 410. In other embodiments, the flow-way 410 can receive the water 412 from a pipe, as runoff from an irrigation ditch or channel, from a diverted waterway (e.g., a stream or river), or from substantially any other source of water. The water 412 flows out of an outlet end 418 of the flow-way 410 and to an outlet channel 420. The outlet channel 420 is configured to carry the water 412 to a location where the water is desirably stored, discharged, or employed for some useful purpose.

The water 412 can include algae or other biomass suspended therein or floating thereon. By way of example, and referring once again to FIG. 3, a portion of the algal growth 314 present in the flow-way 306 can break away from the remainder of the algal growth 314 and be carried downstream by water flowing through the flow-way 306. In other examples, and referring again to FIG. 4, algae or other biomass may be present in an upstream water source from which the flow-way 410 receives the water 412. Biomass present in or on the water 412 can disrupt the functioning of downstream water systems by accumulating in and clogging water containment and diversion devices (e.g., pipes, tanks, reservoirs, channels, etc.). For example, algae and other biomass present in or on the water 412 can clog the outlet channel 420, thereby causing a backup of water that can prevent the water 412 from properly draining from the flow-way 410.

Accordingly, the system 400 further comprises a harvesting system 422 that is configured to strain algae and other biomass from a flow of the water 412 leaving the flow-way 410. The harvesting system 422 mitigates fouling of downstream water containment and diversion devices (e.g., the outlet channel 420). The harvesting system 422 includes a hinged container 424 that has a straining screen 426 positioned therein. The straining screen 426 is configured such that water (e.g., the water 412) can flow through the screen 426 while at least a portion 428 of biomass present on a surface of or suspended in the water is captured by the screen 426. The hinged container 424 is positioned downstream from the flow-way 410 such that the hinged container 424 receives the water 412 that flows out of the flow-way 410. The exemplary hinged container 424 shown in FIG. 4 has an open top 430. The hinged container 424 is positioned at the outlet end 418 of the flow-way 410 such that the water 412 flows into the open top 430 of the hinged container 424 as the water 412 exits the flow-way 410. It is to be understood that instead of the hinged container 424 having an open top 430, the hinged container 424 and the flow-way 410 can be joined by a channel configured to conduct the water 412 from the flow-way 410 to the hinged container 424. The hinged container 424 further comprises an outlet port 432 that is in fluid communication with the outlet channel 420, such that the water 412 flows from the flow-way 410 into the hinged container 424 and then out of the outlet port 432 and into the outlet channel 420. As the water 412 passes through the screen 426, therefore, the biomass 428 is strained prior to the water 412 reaching the outlet channel 420, preventing waterways and water containment/diversion devices downstream from the system 400 from being fouled by the biomass 428.

As the water 412 continues to flow into the hinged container 424 and through the screen 426, the biomass 428 accumulates on the screen 426. As the biomass 428 accumulates, the screen 426 can become fouled such that the water 412, or a portion thereof, is unable to flow into the outlet port 432 and on to the outlet channel 420. The hinged container 424 is therefore configured to dump the biomass 428 after a sufficient quantity of the biomass 428 is accumulated on the screen 426. The system 400 further comprises a second container 433 that is configured to receive and store accumulated biomass until the biomass can be collected. By way of example, the second view 404 of the system 400 shows that the hinged container 424 rotates, or tips, about a hinge 434 when a quantity of the biomass 428 is accumulated on the screen 426. As indicated in the third view 406, and as described in greater detail below, when the hinged container 424 tips, the biomass 428 falls from the hinged container 424 and into the second container 433. After the biomass 428 is deposited in the second container 433, the hinged container 424 returns to its original position (i.e., a position of the hinged container 424 prior to tipping), as shown in the fourth view 408 of the exemplary system 400.

The hinged container 424 can be configured such that the hinged container 424 rotates about the hinge 434 based upon a weight of the accumulated biomass 428, or a weight of water accumulated on the screen 426 by virtue of the screen 426 being fouled by the biomass 428. In exemplary embodiments, the hinged container 424 is shaped such that a first sidewall 436 of the hinged container 424 is sloped relative to a bottom surface 438 of the hinged container 424. The first sidewall 436 can be sloped such that when water fills the hinged container 424, or water and/or biomass accumulates in a portion of the hinged container 424 that is above the straining screen 426, the weight of the accumulated water/biomass causes the container 424 to tip toward the direction of slope of the first sidewall 436. In such embodiments, the weight of the container 424 and its contents is insufficient to keep the hinged container 424 from tipping when sufficient biomass 428 or water 412 accumulates in the hinged container 424. In various embodiments, the hinged container 424 is shaped as a trapezoidal prism. In further embodiments, the straining screen 426 can be positioned at an angle within the hinged container 424, relative to the bottom surface 438, such that biomass and water that accumulate in a portion of the hinged container 424 above the straining screen 426 tend to accumulate where they will cause the hinged container 424 to tip.

As shown in the third and fourth views 406, 408 of the exemplary system 400, the hinged container 424 is configured to return to its original position once the accumulated biomass 428 is deposited in the second container 433. By way of example, and not limitation, the hinged container can comprise a weight 440 affixed to a second sidewall 442 of the hinged container 424. The weight 440 tends to cause the hinged container 424 to rotate about the hinge 434 to its original position when the hinged container 424 is in the tipped position. The second sidewall 442 can be a sidewall of the hinged container 424 opposite the first sloped sidewall 436. In another non-limiting example, the hinged container 424 can include a spring 444. A first end of the spring 444 can be affixed to the hinged container 424 (e.g., the second sidewall 442 of the hinged container 424). A second end of the spring 444 can be affixed to a backstop 446. So configured, the spring 444 tends to cause the hinged container 424 to return to its original position after tipping, responsive to accumulated water or accumulated biomass 428 being deposited in the second container 433. In various embodiments, either or both of the spring 444 or the weight 440 can be included in the harvesting system 422 to cause the hinged container 424 to return to its original position after tipping.

Figure 5:
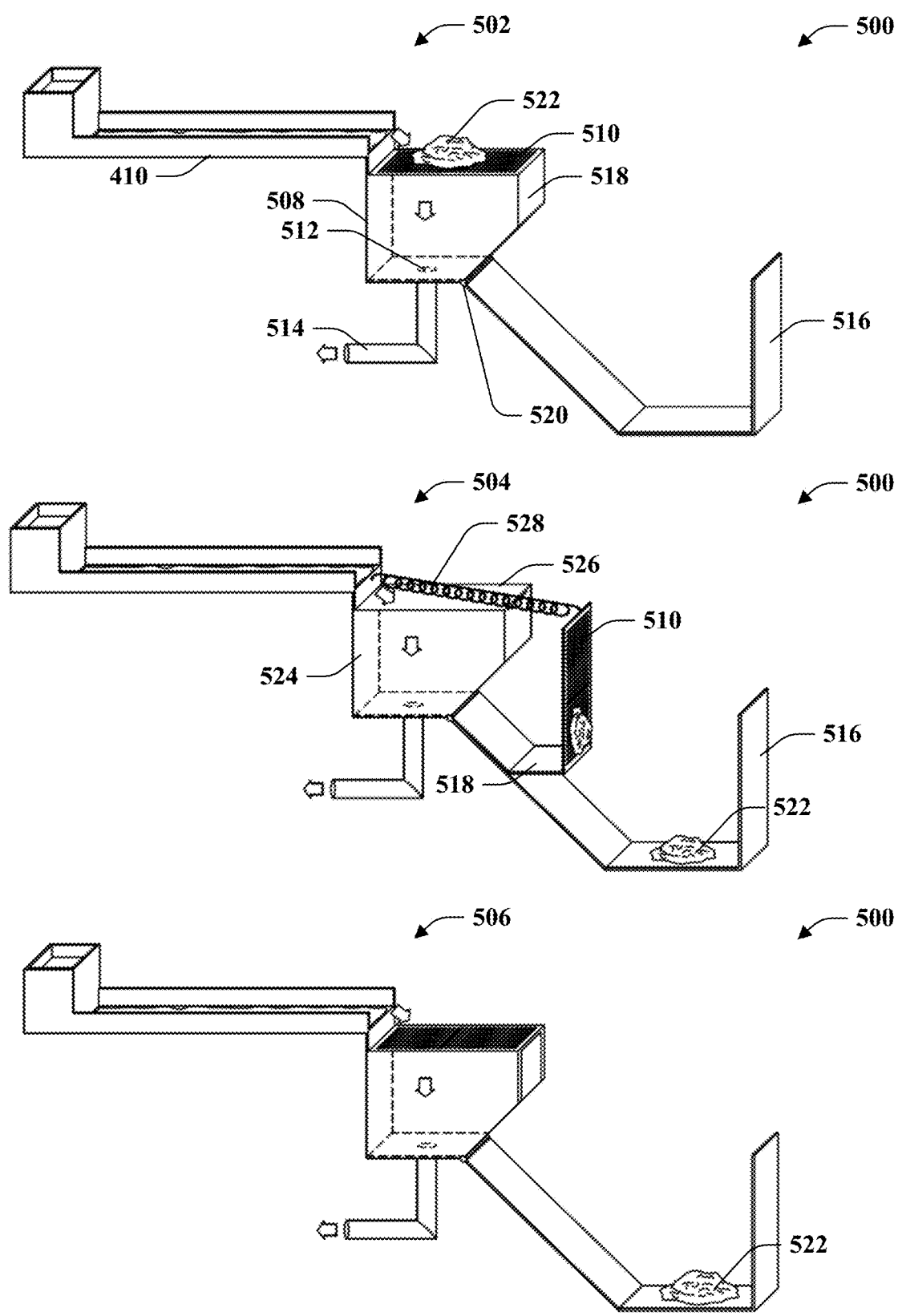
FIG. 5 is perspective diagram showing views of still other exemplary flow-way systems for harvesting algae and other biomass from a flow of water.

In the harvesting system 422, the whole of the hinged container 424 is configured to rotate about the hinge 434 in order to deposit the biomass 428 in the second container. In other embodiments, a hinged container can be configured such that only a portion of the hinged container moves in order to deposit biomass in a second container. By way of example, and referring now to FIG. 5, three views 502-506 of an exemplary algae/biomass harvesting system 500 is shown. The system 500 comprises the flow-way 410, a hinged container 508 that comprises a straining screen 510 and an outlet port 512, an outlet channel 514, and a second container 516. The hinged container 508 is positioned such that water flowing from the flow-way 410 passes through the straining screen 510 and enters the hinged container 508. The water then drains from the hinged container 508 into the outlet channel 514 by way of the outlet port 512. The straining screen 510 is positioned at the top of the hinged container 508. In other embodiments, the straining screen 510 could be positioned lower within the hinged container 508.

The hinged container 508 further comprises a sidewall 518 that is affixed to a hinge 520. As shown in the second view 504 of the system 500, the sidewall 518 is attached to the screen 510 such that when biomass 522 accumulates on the screen 510, the sidewall 518 rotates about the hinge 520 (e.g., as shown in the second view 504 of the system 500). The sidewall 518 rotates toward the second container 516 such that the accumulated biomass 522 falls from the screen 510 and is deposited into the second container 516. Whereas the sidewall 518 rotates about the hinge 520 when sufficient biomass 522 accumulates on the screen 510, remaining sidewalls of the hinged container 508 (e.g., a second sidewall 524 and a third sidewall 526) can be configured to remain in place. Therefore, as water continues to flow into the hinged container 508 from the flow-way 410, the water can be kept substantially contained within the hinged container 508 excepting a portion of the water that flows downward into the second container 516 through the screen 510.

As shown in the second view 504 of the system 500, the sidewall 518 can be attached to the hinged container 508 by a spring 528. The spring 528 is configured to exert a force on the screen 510 and sidewall 518 that causes the screen 510 and sidewall 518 to return to their original positions prior to rotating (e.g., as shown in the first view 502 and the third view 506 of the system 500). By way of example, the spring 528 can be attached at one end to the screen 510, which is in turn attached to the sidewall 518. The spring 528 can be attached at a second end to the flow-way 410 or another portion of the hinged container 508 (e.g., the fixed position sidewall 524). Responsive to the sidewall 518 and screen 510 rotating about the hinge 520, the spring 528 stretches. The spring 528 is configured as a tension spring such that, as the spring 528 is stretched in response to rotation of the sidewall 518 and screen 510 about the hinge 520, the spring 528 exerts a force on the screen 510 and sidewall 518 that tends to oppose such rotation. Thus, when the weight of the biomass 522 is no longer present on the screen 510, the spring 528 causes the screen 510 and sidewall 518 to return to their original positions as shown in the third view 506 of the system 500.

The harvesting systems 422, 500 mitigate fouling of water containment and diversion devices downstream from the flow-way 410 by removing algae and other biomass from a flow of water. The harvesting systems 422, 500 also aid in the collection, or harvesting, of algae and other biomass from a flow of water. As algae and other biomass 428, 522 accumulate in the second containers 433, 516 the algae/biomass 428, 522 can be periodically collected in order to be used for various purposes. In various embodiments, a harvesting system can be employed in conjunction with the flow-way 100, which is configured to facilitate growth of algae within the flow-way 100.

Figure 6:
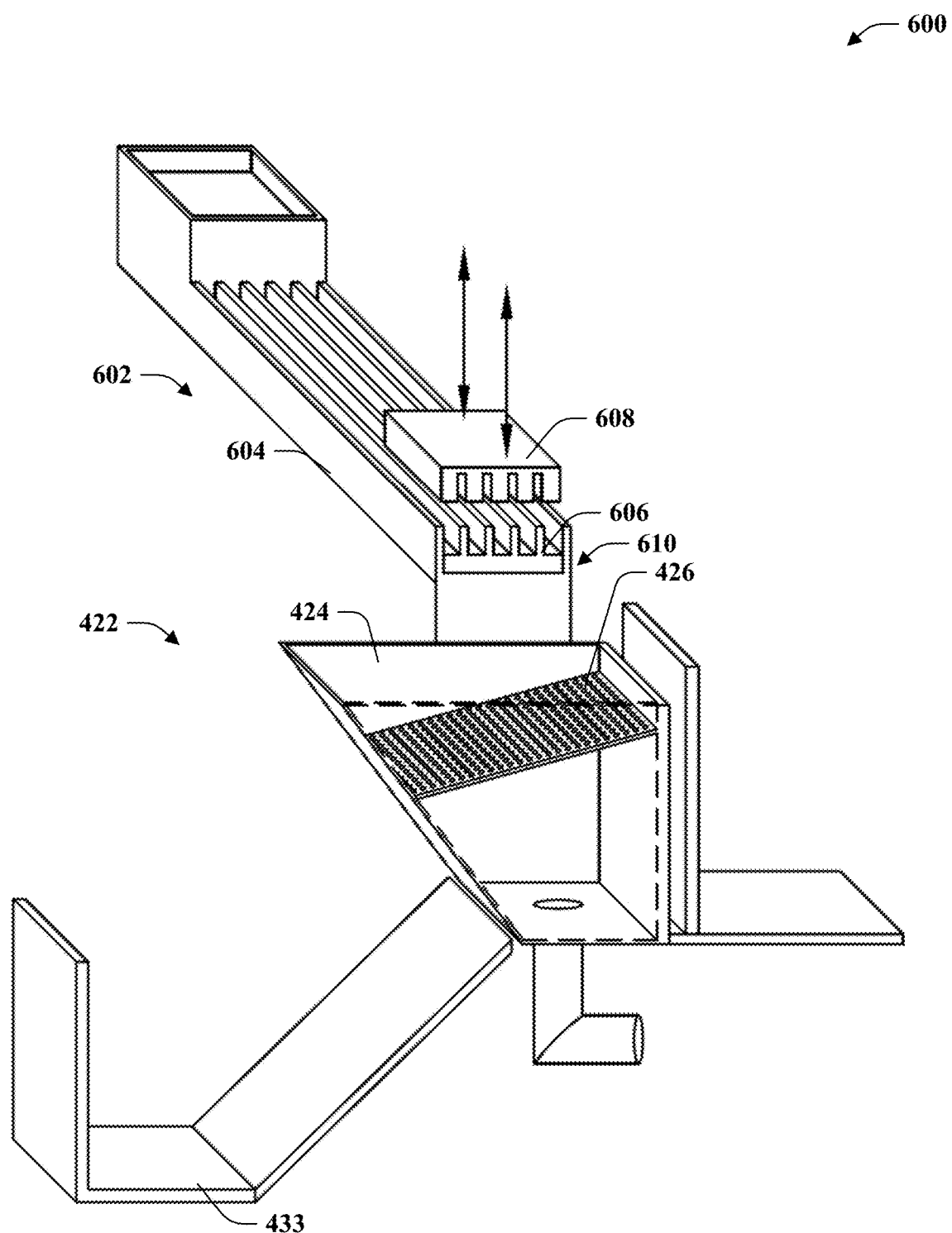
FIG. 6 is a perspective diagram of yet another exemplary flow-way system for harvesting algae and other biomass from a flow of water.

By way of example, and referring now to FIG. 6, an exemplary system 600 that facilitates growing and harvesting algae and other aquatic biomass is illustrated. The system 600 comprises a flow-way 602 configured to facilitate the growth of algae, and the harvesting system 422 positioned downstream from the flow-way 602. The flow-way 602 comprises a channel 604 and one or more dividers 606 positioned in the channel 604. Algae can grow along surfaces of the dividers 606 and take up nutrients from water flowing in the flow-way 602. Algae that grows on surfaces of the flow-way 602 and later becomes detached from the flow-way 602 can be collected and harvested by the harvesting system 422 (e.g., as described above with respect to FIG. 4). A harvesting device 608 that is configured to mate with the flow-way 602 (e.g., in similar fashion to the harvesting device 308 and flow-way 306 described with respect to FIG. 3) can be employed to remove algae from surfaces of the flow-way 602. For example, the harvesting device 608 can be lowered into the channel 604 such that the harvesting device 608 mates with the dividers 606. The harvesting device 608 can then be moved along the flow-way 602 toward an outlet 610 of the flow-way 602, such that algae scraped by the harvesting device 608 is deposited on the screen 426 of the hinged container 424. Algae accumulated on the screen 426 can then be deposited in the second container 433 in the manner described with respect to FIG. 4. Thus, the system 600 is suited to facilitate water filtration based upon algae growth in a flow-way, and harvesting of the algae either for use of the algae in various applications or to facilitate growth of additional algae in the flow-way.

Figure 7:
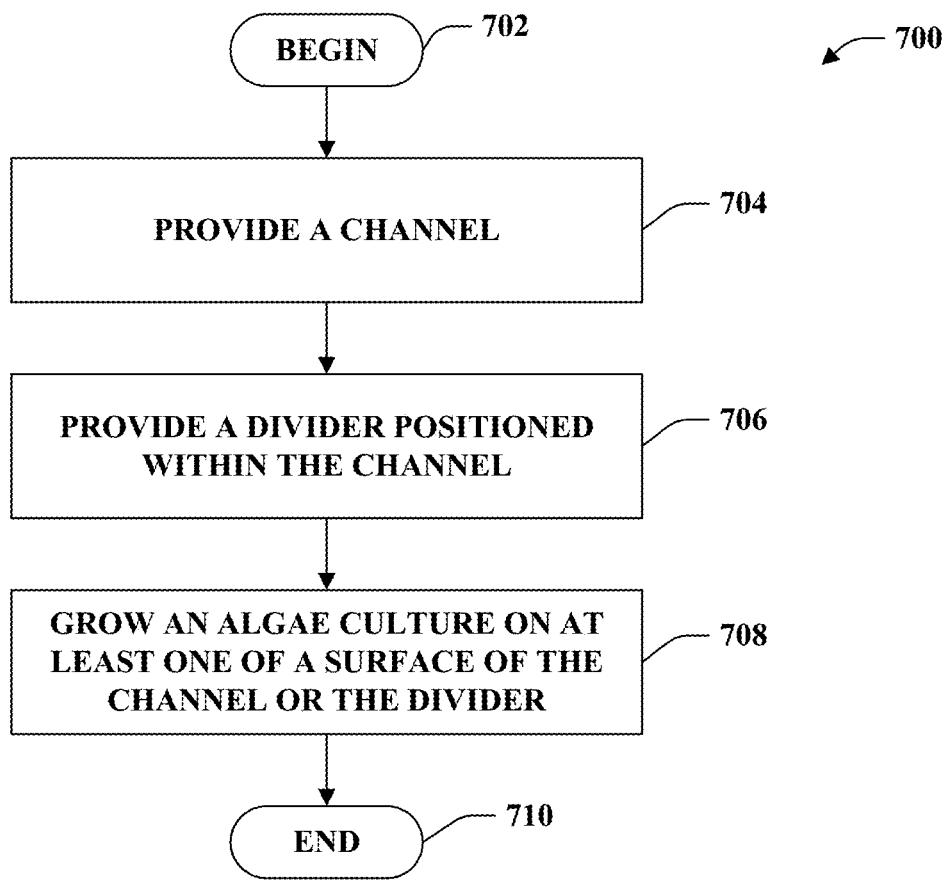
FIG. 7 is a flow diagram that illustrates an exemplary methodology for making a flow-way system for algae growth and filtering of algal nutrients and other contaminants from a flow of water.
Figure 8:
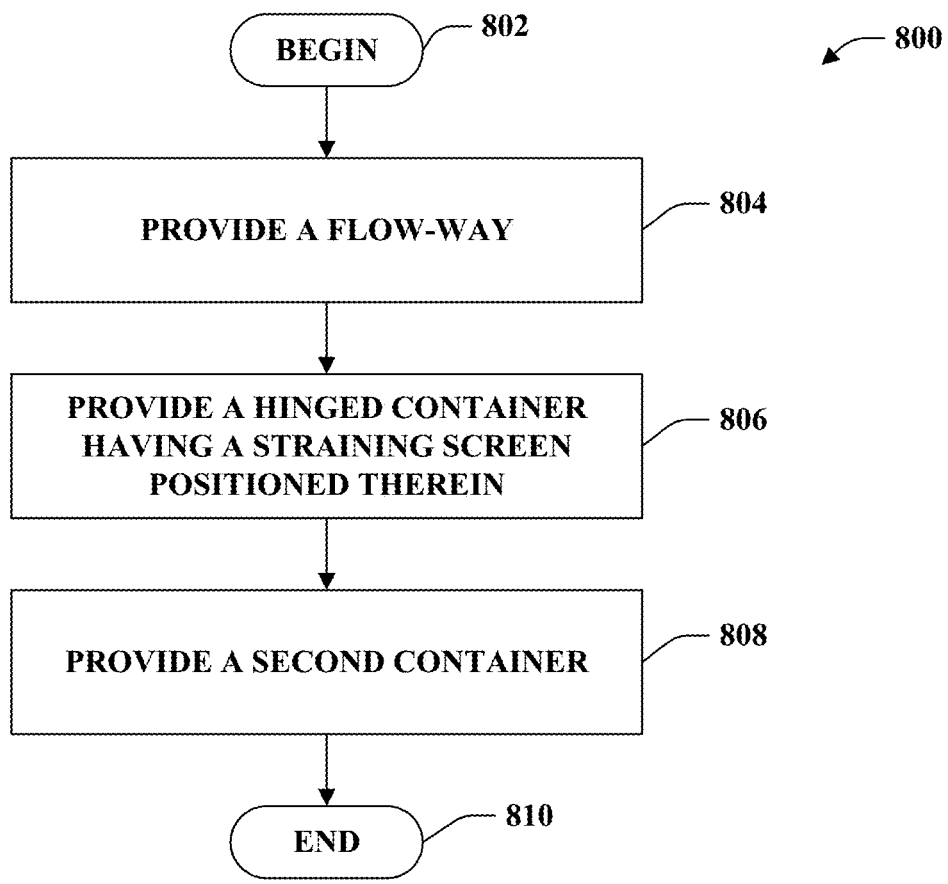
FIG. 8 is a flow diagram that illustrates an exemplary methodology for making a system for harvesting algae and other biomass from a flow of water.

FIGS. 7 and 8 illustrate exemplary methodologies relating to making algae-based water filtration, algae growth, and algae harvesting systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now to FIG. 7, a methodology 700 that facilitates making a flow-way for growing algae and for algae-based water filtration is illustrated. The methodology 700 begins at 702, and at 704 a channel is provided. The channel is configured to accommodate a flow of water within the channel along its length. By way of example, the channel can have a bottom surface and one or more sidewalls that collectively define an interior space in which water flows. At 706, a divider is provided, wherein the divider is positioned within the channel. The divider separates the channel into a first portion and a second portion, wherein the first and second portions are respective sub-channels extending along at least a portion of the length of the channel. At 708, an algae culture is grown on at least one of a surface of the channel or the divider. In exemplary embodiments, the algae culture can be grown on the surface of the channel or the divider by placing a pre-seeded mesh element within the channel, the pre-seeded mesh element having an algae culture grown thereon (e.g., as described above with respect to FIG. 2). As water flows within the channel, the algae culture takes up nutrients from the water (e.g., phosphorous and/or nitrogen) and grows along further portions of the channel and/or divider. Thus, as water flows within the channel, the algae culture removes algal nutrients from the water to fuel its own growth. The flow-way manufactured according to the methodology 700 is therefore suited to mitigating algal blooms in waterways that are downstream from the flow-way. The methodology 700 completes at 710.

Referring now to FIG. 8, a methodology 800 that facilitates making a system for harvesting algae or other biomass from a flow of water is illustrated. The methodology 800 begins at 802 and at 804 a flow-way is provided. The flow-way provided at 804 can be substantially any device configured to contain and direct a flow of water such as, but not limited to, a pipe, a channel, a ditch, a hose, a diverted natural waterway, or the like. At 806, a hinged container is provided, wherein the hinged container has a straining screen positioned therein. The hinged container is provided such that the hinged container is positioned downstream from the flow-way provided at 804, so that the hinged container receives water from the flow-way. Thus, algae and other biomass suspended in or positioned on a surface of water flowing in the flow-way is strained by and accumulated on the straining screen positioned in the hinged container. At 808, a second container is provided, wherein the second container is positioned in proximity to the hinged container. The hinged container provided at 806 is configured such that, as algae or other biomass accumulates on the straining screen, a weight of the accumulated biomass causes the hinged container to tip. When the hinged container tips, the biomass accumulated on the straining screen is deposited into the second container. Thus, the methodology 800 is suited to making a harvesting system that mitigates fouling of waterways downstream from a flow-way by automatically straining biomass from water exiting the flow-way and depositing such biomass in a container for collection while allowing the water to flow on. The methodology 800 ends at 810.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a flow-way configured to accommodate a flow of water, the flow-way having an output end at which water leaves the flow-way, the flow-way comprising:
   a channel having a length and a breadth, wherein water flowing through the channel flows along the length of the channel, the channel comprising a bottom surface and a sidewall;
   a divider that is positioned within the channel and that extends along the length of the channel, wherein the divider separates the channel into a first portion and a second portion; and
   an algal growth formed on at least one of the bottom surface of the channel, the sidewall of the channel, or the divider, the algal growth configured to remove a contaminant from water flowing through the flow-way; and
   a straining screen, the straining screen positioned such that water exiting the flow-way passes through the straining screen.

2. The system of claim 1, wherein the contaminant comprises nitrogen or phosphorous.

3. The system of claim 1, wherein the contaminant comprises at least one of arsenic, mercury, lead, or selenium.

4. The system of claim 1, further comprising a harvesting device, the harvesting device having a cross-sectional surface profile that matches a cross-sectional surface profile of the flow-way.

5. The system of claim 4, the channel having an open top such that the harvesting device can be lowered into the channel, wherein the harvesting device is configured such that, when the harvesting device is positioned within the channel, movement of the harvesting device along the length of the channel causes the harvesting device to remove at least a portion of the algal growth from the sidewall of the channel or the divider.

6. The system of claim 1, further comprising:
   a hinged container that comprises an outlet port, the straining screen positioned within the hinged container such that water that exits the flow-way passes through the straining screen and into the hinged container, wherein water exits the hinged container by way of the outlet port.

7. The system of claim 6, wherein the hinged container has an open top, the hinged container positioned such that water leaving the flow-way at the output end of the flow-way flows into the open top of the hinged container.

8. The system of claim 6, the hinged container configured such that, responsive to a biomass accumulating on the straining screen, water accumulates in a first portion of the hinged container, and wherein accumulation of the water in the first portion of the hinged container causes the hinged container to tip, wherein responsive to the hinged container tipping, the accumulated biomass is deposited into a receptacle.

9. The system of claim 8, the hinged container further comprising a counterweight positioned such that when the accumulated biomass is deposited into the receptacle, the hinged container returns to its original position prior to tipping.

10. The system of claim 8, the hinged container further comprising a spring, the spring having a first end and a second end, the first end of the spring attached to the flow-way, the second end of the spring attached to the hinged container such that the spring exerts a force on the hinged container that causes the hinged container to return to its original position prior to tipping in response to the accumulated biomass being deposited into the receptacle.

11. The system of claim 1, wherein the algal growth comprises filamentous periphytic algae.

12. The system of claim 1, further comprising a mesh, the mesh having an algae culture growing thereon, wherein the mesh is laid in a bottom surface of the channel, the algal growth being an outgrowth of the algae culture.

13. A system for water filtration comprising:
   a channel having a length and a breadth, wherein water flowing through the channel flows along the length of the channel, the channel comprising a bottom surface and a sidewall;

a divider that is positioned within the channel and that extends along the length of the channel, wherein the divider separates the channel into a first portion and a second portion; and a mesh element having an algae culture growing thereon, the mesh element being laid within the channel such that water flowing through the channel flows over the mesh element.

14. The system of claim 13, wherein the mesh element is composed of a flexible plastic.

15. The system of claim 13, wherein the mesh element is a rolled element that is unrolled along the length of the channel.

16. The system of claim 13, further comprising an algal growth formed on at least one of the bottom surface, the sidewall, or the divider, the algal growth being an outgrowth of the algae culture.

17. The system of claim 16, further comprising a harvesting device, the harvesting device having a cross-sectional surface profile that matches a cross-sectional surface profile of the channel and the divider, wherein movement of the harvesting device along the length of the channel causes the harvesting device to remove at least a portion of the algal growth from the sidewall of the channel or the divider.

18. A system for harvesting algal biomass, the system comprising:
  a flow-way configured to accommodate a flow of water, the flow-way comprising:
    a channel having a length and a breadth, wherein water flowing through the channel flows along the length of the channel, the channel comprising a sidewall;
    a divider that is positioned within the channel and that extends along the length of the channel, wherein the divider separates the channel into a first portion and a second portion; and
    an algal growth formed on at least one of the sidewall of the channel or the divider, the algal growth configured to remove a contaminant from water flowing through the flow-way; and
  a harvesting system that comprises:
    a straining screen configured to strain algal biomass from water flowing through the straining screen;
    a first container; and
    a second container that comprises a fluid outlet, the second container positioned such that the second container receives water from the flow-way, the straining screen positioned within the second container such that water entering the second container passes through the straining screen prior to reaching the fluid outlet, wherein responsive to algal biomass accumulating on the straining screen the second container tips, thereby depositing the accumulated algal biomass into the first container.

19. The system of claim 18, wherein the harvesting system further comprises a spring, wherein the spring is configured such that, when the second container tips, the spring exerts a force on the second container that causes the second container to return to its original position prior to tipping.

20. The system of claim 18, wherein the second container further comprises a weight, wherein the weight is positioned on the second container such that, when the second container tips, the weight exerts a force on the second container that causes the second container to return to its original position prior to tipping.

* * * * *